United States Patent
Shimura et al.

(10) Patent No.: US 11,539,391 B2
(45) Date of Patent: Dec. 27, 2022

(54) WIRELESS COMMUNICATION APPARATUS AND CONTROL METHOD THEREFOR

(71) Applicant: CANON KABUSHIKI KAISHA, Tokyo (JP)

(72) Inventors: Hajime Shimura, Yokohama (JP); Hirohiko Inohiza, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/704,351

(22) Filed: Dec. 5, 2019

(65) Prior Publication Data
US 2020/0112331 A1 Apr. 9, 2020

Related U.S. Application Data

(63) Continuation of application No. PCT/JP2018/021043, filed on May 31, 2018.

(30) Foreign Application Priority Data

Jun. 6, 2017 (JP) .............................. JP2017-111360
Nov. 30, 2017 (JP) .............................. JP2017-230042

(51) Int. Cl.
*H04B 1/401* (2015.01)
*H04B 17/336* (2015.01)
*H04B 1/00* (2006.01)

(52) U.S. Cl.
CPC ............. *H04B 1/401* (2013.01); *H04B 1/006* (2013.01); *H04B 17/336* (2015.01)

(58) Field of Classification Search
CPC ...... H04B 1/401; H04B 17/336; H04B 1/006; H04B 1/0053
See application file for complete search history.

(56) References Cited

U.S. PATENT DOCUMENTS

| 7,035,606 B2 | 4/2006 | Matsuura et al. |
| 2006/0073827 A1* | 4/2006 | Vaisanen ........... H04W 36/0058 455/436 |

(Continued)

FOREIGN PATENT DOCUMENTS

| CN | 106776417 A | 5/2017 |
| JP | 2001-217743 A | 8/2001 |

(Continued)

OTHER PUBLICATIONS

International Preliminary Report on Patentability dated Dec. 10, 2019, in corresponding PCT application No. PCT/JP2018/021043.

(Continued)

*Primary Examiner* — Ayaz R Sheikh
*Assistant Examiner* — Tarell A Hampton
(74) *Attorney, Agent, or Firm* — Venable LLP

(57) ABSTRACT

A wireless communication apparatus 20 includes: a first communication unit configured to perform wireless communication that supports a plurality of wireless communication systems with different using frequency bands; a second communication unit configured to perform wired communication that supports a plurality of wired communication systems each with a different basic frequency used in data communication; and a switching unit configured to switch a wired communication system used in the wired communication by the second communication unit so that the basic frequency falls outside a predetermined frequency band including the using frequency bands of the wireless communication by the first communication unit.

14 Claims, 9 Drawing Sheets

(56) References Cited

U.S. PATENT DOCUMENTS

| | | | | |
|---|---|---|---|---|
| 2007/0140256 | A1* | 6/2007 | Yaqub | H04W 28/0231 |
| | | | | 370/395.5 |
| 2014/0244852 | A1* | 8/2014 | Goh | H04L 69/14 |
| | | | | 709/230 |
| 2016/0044664 | A1 | 2/2016 | Inohiza | |
| 2016/0092393 | A1* | 3/2016 | Nge | G06F 13/4068 |
| | | | | 710/14 |
| 2016/0183141 | A1* | 6/2016 | Kim | H04W 8/22 |
| | | | | 455/552.1 |
| 2016/0275873 | A1* | 9/2016 | Taylor | G06F 3/04842 |
| 2017/0046302 | A1* | 2/2017 | Chen | G06F 13/409 |
| 2017/0223597 | A1* | 8/2017 | Telang | H04W 36/24 |

FOREIGN PATENT DOCUMENTS

| | | |
|---|---|---|
| WO | 2017-088308 A | 6/2017 |
| WO | 2017088308 A | 6/2017 |

OTHER PUBLICATIONS

Written Opinion issued in corresponding parent International Application No. PCT/JP2018/021043 dated May 31, 2018.

International Search Report issued in corresponding parent International Application No. PCT/JP2018/021043 dated Aug. 21, 2018.

Japanese Office Action dated Aug. 31, 2021 in counterpart Japanese Patent Appln. No. 2017-111360.

Japanese Office Action dated Jan. 11, 2022 in counterpart Japanese Patent Appln. No. 2017-230042.

Summer Ponzu, "[Caution] USB 3.0 interferes with 2.4 GHz (Bluetooth, etc.) and the like," May 3, 2017, Geek Girls Log, pp. 1-10, URL: https://mupon.net/usb3noise/, [Accessed: Dec. 28, 2021].

Samara Lynn, "Wireless Witch: The Truth About USB 3.0 and Wi-Fi Interference," Sep. 5, 2013, pp. 1-10, PC Mag, URL: https://www.pcmag.com/opinions/wireless-witch-the-truth-about-usb-30-and-wi-fi-interference#: [Accessed: Dec. 28, 2021].

* cited by examiner

FIG. 5

| WIRED COMMUNICATION METHOD | PHYSICAL LAYER DATA TRANSFER RATE | EFFECTIVE DATA TRANSFER RATE OF APPLICATION LAYER | BASIC FREQUENCY FOR USE IN USB DATA TRANSFER | FREQUENCY BAND NON-USABLE IN WIRELESS COMMUNICATION |
|---|---|---|---|---|
| USB 1.0 | 12 M bps | 6 M bps | 6MHz | - |
| USB 1.1 | 12 M bps | 6 M bps | 6MHz | - |
| USB 2.0 | 480 M bps | 200 M bps | 240MHz | - |
| USB 3.0 | 5 G bps | 2 G bps | 2.5GHz | 2.4GHz |
| USB 3.1 | 10 G bps | 5 G bps | 5GHz | 5GHz |

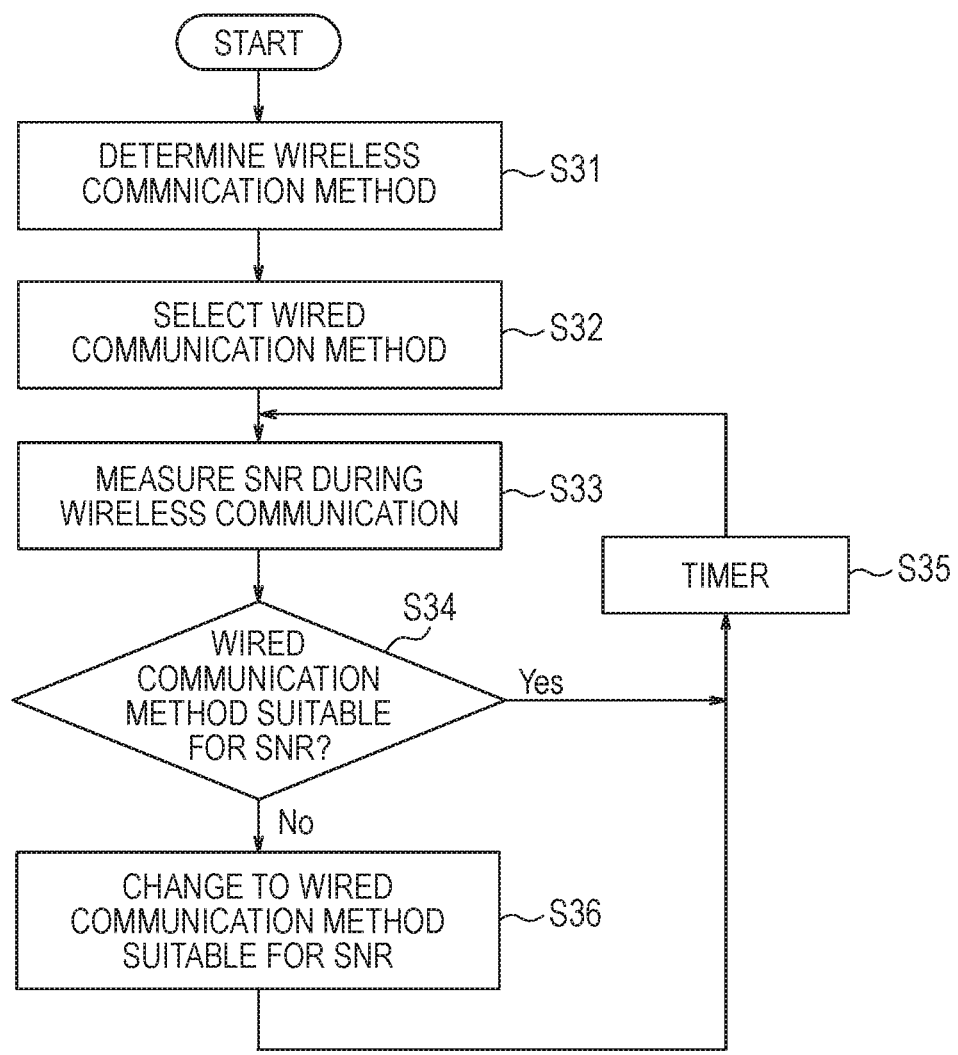

WIRELESS COMMUNICATION APPARATUS AND CONTROL METHOD THEREFOR

CROSS-REFERENCE TO RELATED APPLICATIONS

This application is a Continuation of International Patent Application No. PCT/JP2018/021043, filed May 31, 2018, which claims the benefit of Japanese Patent Application No. 2017-111360, filed Jun. 6, 2017, and Japanese Patent Application No. 2017-230042, filed Nov. 30, 2017, all of which are hereby incorporated by reference herein in their entirety.

BACKGROUND OF THE INVENTION

Field of the Invention

The present invention relates to a wireless communication apparatus and a control method therefor.

Description of the Related Art

In recent years, various electronic apparatuses are equipped with wireless communication functions. Such electronic apparatuses equipped with the wireless communication functions have been reduced in size year by year and include many components and wires disposed close to each other. These components and wires produce noise, which can adversely affect the wireless communication functions.

Japanese Patent Application Laid-Open No. 2001-217743 discloses that a data communication apparatus to which a wireless communication apparatus is connected performs clock control such that multiplied frequencies of an operation clock of a main CPU do not interfere with a frequency band that the wireless communication apparatus uses in wireless communication.

SUMMARY OF THE INVENTION

In a case where a wireless communication function is installed into an electronic apparatus, an electronic circuit substrate for wireless communication that implements the wireless communication function is connected in a wired manner to a main electronic circuit substrate of the electronic apparatus, and between the electronic circuit substrate for wireless communication and the main electronic circuit substrate, transport of data transmitted and received by the electronic circuit substrate for wireless communication in the wireless communication. At this point, noise by wired data communication can occur between the electronic circuit substrate for wireless communication and the main electronic circuit substrate. The noise by this data communication can also have an adverse effect on the wireless communication.

Hence, the present invention has an objective to mitigate an adverse effect of the noise occurring in the wired data communication on wireless communication performance. In order to solve the above technical problem, according to an aspect of the present invention, a wireless communication apparatus comprises: a first communication unit configured to perform wireless communication that supports a plurality of wireless communication systems with different using frequency bands; a second communication unit configured to perform wired communication that supports a plurality of wired communication systems each with a different basic frequency used in data communication; and a switching unit configured to switch a wired communication system used in the wired communication by the second communication unit so that the basic frequency falls outside a predetermined frequency band including the using frequency bands of the wireless communication by the first communication unit.

The present invention can mitigate the adverse effect of the noise occurring in the wired data communication on wireless communication performance.

Further features of the present invention will become apparent from the following description of exemplary embodiments with reference to the attached drawings.

BRIEF DESCRIPTION OF THE DRAWINGS

FIG. 5 is an explanatory diagram of the USB standard.

FIG. 11 is a flowchart illustrating a procedure of changing a wired communication system in a third embodiment.

DESCRIPTION OF THE EMBODIMENTS

Embodiments for carrying out the present invention will be described below in detail with reference to the accompanying drawings. Note that the embodiments to be described below are examples of how to implement the present invention and should be altered or modified as appropriate according to a configuration of an apparatus to which the present invention is applied and according to various conditions, and the present invention is not limited to the following embodiments.

First Embodiment

Figure 1:
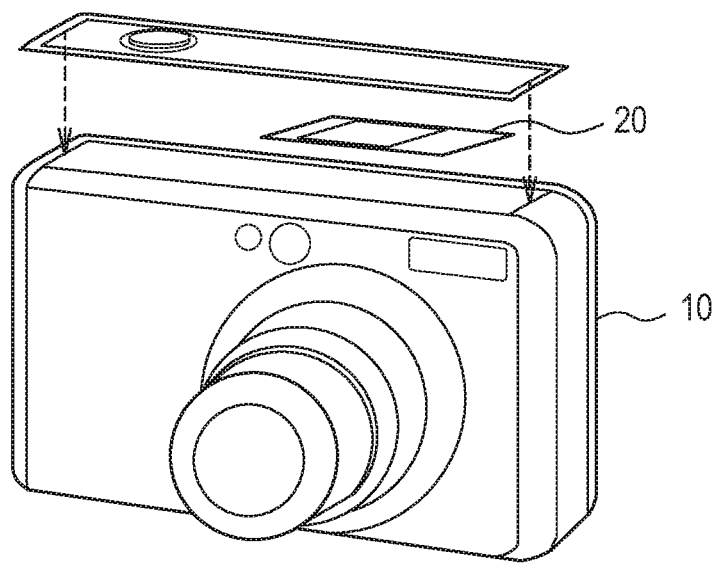
FIG. 1 illustrates a configuration example of an electronic apparatus that includes a wireless communication apparatus according to the present embodiments.

FIG. 1 illustrates a configuration example of an electronic apparatus 10 that includes a wireless communication apparatus 20 according to the present embodiment. The present embodiment will be described along with a case where the electronic apparatus 10 is equipped with the wireless communication apparatus 20. It can be assumed here that, for example, the electronic apparatus 10 is a digital camera and the wireless communication apparatus 20 is a wireless communication module that uses wireless signals to communicate with another wireless communication apparatus.

The electronic apparatus 10 in the present embodiment can simultaneously execute a plurality of communication applications (hereinafter, referred to also as "communication applications") using a plurality of wireless communications with different using frequencies, respectively.

The wireless communication apparatus 20 has a wireless communication function that supports a plurality of wireless communication systems conforming to a plurality of wireless communication standards. The present embodiment will be described along with a case where a wireless communication standard used by the wireless communication apparatus 20 is one of the IEEE802.11 series of standards, which are communication standards for wireless LAN. Here, the IEEE802.11 series of standards include at least the IEEE 802.11a standard, IEEE 802.11b standard, IEEE 802.11g standard, IEEE 802.11n standard, IEEE 802.11ac standard, and IEEE 802.11ax standard, and may include other standards relating to the IEEE 802.11. In the above-described wireless communication systems, a frequency band used in the wireless communication (using frequency band) is at least one of 2.4 GHz band and 5 GHz band.

The wireless communication apparatus 20 can perform a plurality of wireless communications conforming to a plurality of wireless communication standards including, for example, the IEEE 802.11a standard, using the 5 GHz band, and the IEEE 802.11b standard, using the 2.4 GHz band, simultaneously according to using communication applications. Note that performing the wireless communications "simultaneously" by the wireless communication apparatus 20 includes, for example, a state where the wireless communication apparatus 20 participates or establishes a plurality of wireless networks using frequency bands different from each other, for example, a 5 GHz band and a 2.4 GHz band, simultaneously. In a case where the apparatus operates as an access point (AP), the state is where the apparatus simultaneously establishes a plurality of wireless networks using frequency bands different from each other. In contrast, in a case where the apparatus operates as an apparatus (STA) connected to an access point (AP), the state is where the apparatus simultaneously participates in a plurality of wireless networks using frequency bands different from each other. Alternately, in a case where the apparatus operates as an AP and operates as an STA, the state is where a frequency band of a wireless network established by the apparatus differs from a frequency band of a wireless network participated in by the apparatus. That is, performing the wireless communications "simultaneously" by the wireless communication apparatus 20 includes a state where actual wireless data communication is performed in different frequency bands that are switched in a time-sharing manner, while the wireless communication apparatus 20 participates or establishes wireless networks using the different frequency bands, simultaneously. Alternatively, the wireless communication apparatus 20 can also simultaneously perform the wireless communications without switching each of the different frequency bands in a time-sharing manner since the wireless communication apparatus 20 performs the wireless communications using the different frequency bands.

Figure 2:
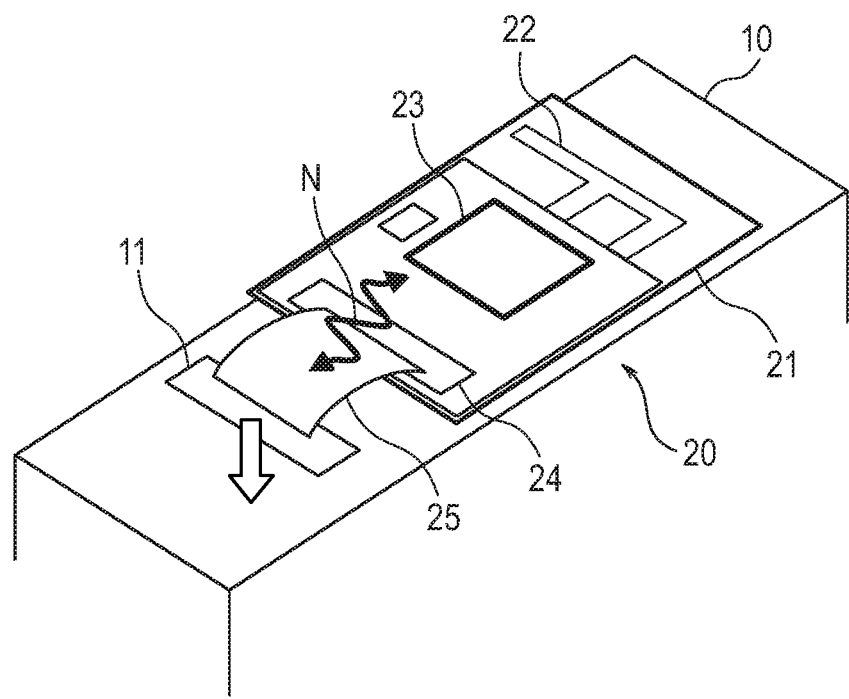
FIG. 2 is a diagram illustrating a configuration example of the wireless communication apparatus.

As illustrated in FIG. 2, the wireless communication apparatus 20 includes an electronic circuit substrate 21, an antenna 22 that transmits and receives electromagnetic waves used for performing the wireless communications, a WiFi chip 23, connector 24, and a cable 25 for wired communication, one end of which is connected to the connector 24. The cable 25 is a flexible cable, and the other end of the cable 25 is connected to a connector 11, which is connected to the main electronic circuit substrate (not illustrated) of the electronic apparatus 10. That is, the electronic circuit substrate 21 of the wireless communication apparatus 20 is connected in a wired manner to the main electronic circuit substrate of the electronic apparatus 10. Between the electronic circuit substrate 21 and the main electronic circuit substrate, data in the wireless communication performed by the wireless communication apparatus 20 (e.g., video data) is transported. As seen from the above, the wireless communication apparatus 20 has the wireless communication function and a wired communication function.

In the present embodiment, the wireless communication apparatus 20 has the wired communication function that supports a plurality of wired communication systems conforming to a plurality of wired communication standards. It is assumed that, for example, the wireless communication apparatus 20 can use USB 1.0, USB 1.1, USB 2.0, USB 3.0, and USB 3.1 as the wired communication standards.

In wired communication, performing data communication can undergo occurrence of noise due to the data communication (data noise N). The data noise N may have an adverse effect on the wireless communication when received by the antenna 22. The wireless communication apparatus 20 has the wireless communication function and the wired communication function as mentioned above, and in a case where the wireless communication apparatus 20 is incorporated in a small electronic apparatus 10, the electronic circuit substrate 21 itself can be made very small. In this case, distances between the antenna 22 for performing the wireless communication provided on the electronic circuit substrate 21, and the cable 25 and the connector 24 for performing the wired communication, and distances between the antenna 22 and the wires and the like on the electronic circuit substrate 21, are made short. This makes it easy for the antenna 22 to receive the data noise N of the wired communication, which tends to have an adverse effect on the wireless communication. In particular, since the cable 25 is a flexible cable, which has a shielding performance poorer than typical USB-dedicated cables, the cable 25 tends to cause the data noise N of the wired communication to occur.

The above-described data noise N of the wired communication occurs in different frequency bands depending on a data transfer rate of the wired communication. In the USB standard, there are different frequency bands within which the data noise N can occur because USB 1.0 to USB 3.1 each have different data transfer rates. Hence, in the present embodiment, the wireless communication system (standard) is switched according to the wireless communication system (standard) used by the wireless communication apparatus 20 in the wireless communication to change the data transfer rate of the wired communication, so that the adverse effect of the data noise N on the wireless communication is mitigated. Specifically, the wired communication system (standard) is switched so that a basic frequency used in USB data communication falls outside a predetermined frequency band that includes the using frequency band of the wireless communication.

In the present embodiment, the wireless communication apparatus 20 can simultaneously perform a plurality of wireless communications with different using frequency bands. Therefore, the wired communication system (standard) is switched so that a basic frequency used in USB data communication falls outside a predetermined frequency band that includes the using frequency band of the plurality of wireless communication.

Figure 3:
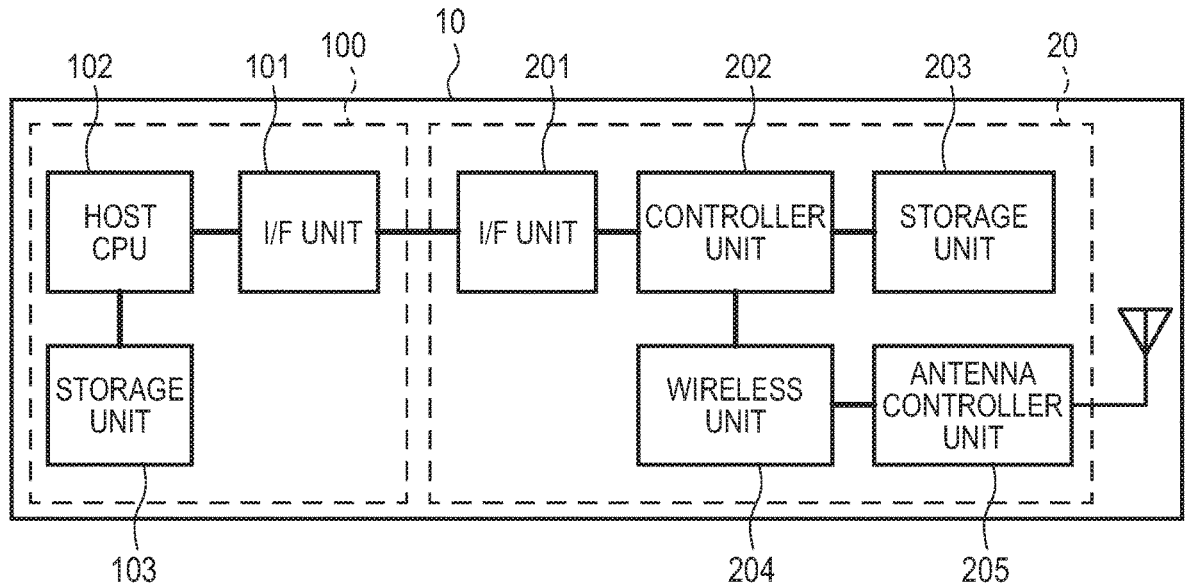
FIG. 3 is an example of a hardware configuration diagram of the wireless communication apparatus.

FIG. 3 is a block diagram illustrating an example of a hardware configuration of the wireless communication apparatus 20.

The electronic apparatus 10 includes a communication controlling unit 100 that controls communication with the wireless communication apparatus 20. The communication controlling unit 100 can be implemented in, for example, the main electronic circuit substrate mentioned above. This communication controlling unit 100 includes an I/F unit 101, a host CPU 102, and a storage unit 103. The I/F unit 101 is a USB interface. Here, since USB 1.0 to USB 3.1 are compatible with each other, the I/F unit 101 can operate as an interface for any one of USB 1.0 to USB 3.1. The operation of the I/F unit 101 is switched by the host CPU 102.

The host CPU 102 is formed by one or more CPUs and controls operation of the electronic apparatus 10 integrally. The storage unit 103 stores a control program and the like necessary for the host CPU 102 to perform processing. The storage unit 103 can be formed by, for example, one or more storage mediums including a ROM, RAM, HDD, flash memory, and detachable SD card. The host CPU 102 executes the control program stored in the storage unit 103 to provide various functions and operations. In the present embodiment, since the electronic apparatus 10 is a digital camera, the electronic apparatus 10 includes an imaging unit, a display unit, and the like, in addition to the hardware configuration illustrated in FIG. 3.

The wireless communication apparatus 20 includes an I/F unit 201, a controlling unit 202, a storage unit 203, a wireless unit 204, and an antenna controlling unit 205. The I/F unit 201 is a USB interface. The I/F unit 201 is connected to the I/F unit 101 of the communication controlling unit 100 through the cable 25 illustrated in FIG. 2. As with the I/F unit 101, this I/F unit 201 can operate as an interface for USB 1.0 to USB 3.1. The operation of the I/F unit 201 is switched by the controlling unit 202.

The controlling unit 202 controls operations in the wireless communication apparatus 20, integrally. The controlling unit 202 can be formed by one or more CPUs. The storage unit 203 is formed by, for example, one or more storage mediums including a ROM and RAM, and stores a control program and the like necessary for the controlling unit 202 to perform processing. The wireless unit 204 performs wireless communication conforming to the IEEE802.11 series of standards. The wireless unit 204 can be formed by the WiFi chip 23. The antenna controlling unit 205 performs controls output of the above-mentioned antenna 22, which can perform communication in the 2.4 GHz band and/or 5 GHz band.

Figure 4:
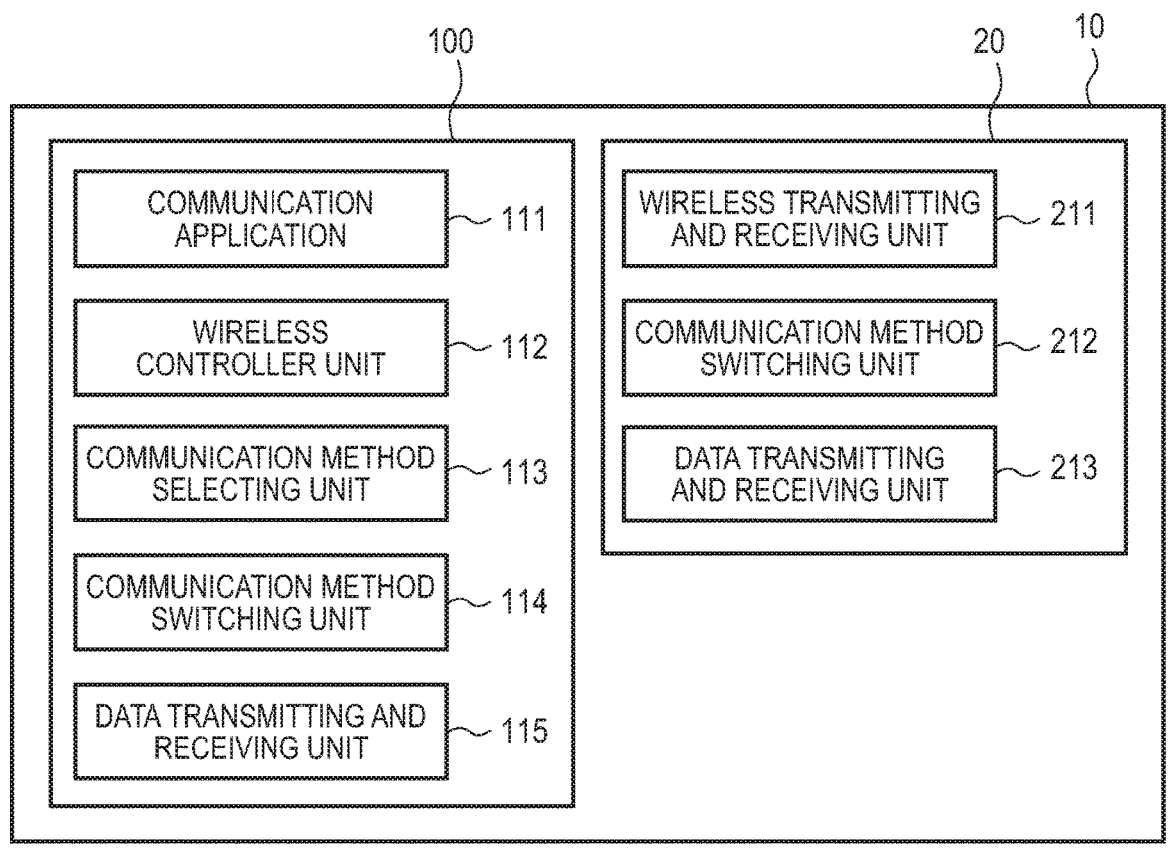
FIG. 4 is an example of a functional block diagram of the electronic apparatus.

FIG. 4 illustrates an example of software functional blocks of the electronic apparatus 10. Functions of components illustrated in this FIG. 4 can be provided by the CPU included in the communication controlling unit 100 or the wireless communication apparatus 20 executing the program.

The present embodiment will be described assuming that functions of the following functional blocks are provided in a form of software programs, but note that some or all of these functional blocks may be provided in a form of hardware. In a case where the functional blocks are provided in a form of hardware, for example, using a given compiler to automatically generate a dedicated circuit on an FPGA from a program for implementing the steps will suffice. The FPGA is an abbreviation of Field Programmable Gate Array. Similarly to the FPGA, a Gate Array circuit may be formed to implement the function blocks in a form of hardware. Alternately, the function blocks may be implemented in a form of an ASIC (Application Specific Integrated Circuit). Note that the functional block diagram illustrated in FIG. 4 is merely an example, and a plurality of function modules may form one function block, or one of the function modules may be separated into modules performing a plurality of functions.

The communication controlling unit 100 includes a communication application 111, a wireless controlling unit 112, a communication system selecting unit 113, a communication system switching unit 114, and a data transmitting and receiving unit 115. The communication application 111 executes a communication application that transfers data to an external communication apparatus in the wireless communication by the wireless communication apparatus 20. The communication application executed by the communication application 111 can be, for example, a communication application that transfers an image taken by a digital camera to the external communication apparatus, such as a smartphone and PC. The communication application 111 can execute a plurality of communication applications simultaneously. In addition, it is assumed that using frequencies wireless communications used by the communication applications are different from each other so as to avoid interference in wireless communication between the communication applications.

The wireless controlling unit 112 sets a wireless communication system used in the wireless communication of the wireless communication apparatus 20 according to a using frequencies of a wireless communication used by a communication application executed by the communication application 111 and controls a wireless transmitting and receiving unit 211 of the wireless communication apparatus 20 described below.

The communication system selecting unit 113 selects a wired communication system used in the wired communication by the data transmitting and receiving unit 115 described below according to the wireless communication system used in the wireless communication by the wireless communication apparatus 20. Specifically, the communication system selecting unit 113 selects a wired communication system in which a basic frequency of wired communication of the wired communication system does not overlap with or is not close to a using frequency band of the wireless communication. In a case where a plurality of wireless communications are performed simultaneously in the wireless communication apparatus 20, the communication system selecting unit 113 selects a wired communication system in which a basic frequency of wired communication of the wired communication system does not overlap with or is not close to using frequency bands of the plurality of wireless communications. A method for selecting the wired communication system will be described below.

The communication system switching unit 114 switches the wired communication system used in the wired communication by the data transmitting and receiving unit 115 to the wired communication system selected by the communication system selecting unit 113. The data transmitting and receiving unit 115 performs data communication with the wireless communication apparatus 20 in a wired communication system conforming to a USB standard.

The wireless communication apparatus 20 includes the wireless transmitting and receiving unit 211, a communication system switching unit 212, and a data transmitting and receiving unit 213.

The wireless transmitting and receiving unit 211 transmits and receives wireless signals to and from an external wireless communication apparatus with the wireless communication system conforming to the IEEE802.11 series of standards. The communication system switching unit 212 switches the wired communication system used in the wired communication by the data transmitting and receiving unit 213 to the wired communication system selected by the communication system selecting unit 113 of the communication controlling unit 100. The data transmitting and receiving unit 213 performs data communication in a wired communication system conforming to a USB standard.

The method for selecting the wired communication system will be described below.

First, the USB standard will be described. FIG. 5 is a diagram illustrating a relation in the USB standard in terms of data transfer rate of physical layer, effective data transfer rate of application layer, and basic frequency. Here, the effective data transfer rate of application layer does not refer to a theoretical data transfer rate but refers to a data transfer rate that can be actually achieved in use of an application. In addition, the basic frequency refers to a frequency at which energy in data communication within a frequency band used in the data communication is substantially maximized. When this basic frequency overlaps with a using frequency band of wireless communication, data noise N produced in the data communication is mixed in from the antenna 22 to have an adverse effect on the wireless communication.

As illustrated in FIG. 5, the USB standard specifies standards each providing a high-speed data transfer rate, and there is a standard a basic frequency of which overlaps with or is close to one of the 2.4 GHz band or the 5 GHz band which are used in wireless LAN. In USB 3.0, a basic frequency used in data transfer is 2.5 GHz, and a frequency band of the data noise N is close to the 2.4 GHz band, which is used in wireless LAN. In USB 3.1, a basic frequency used in data transfer is 5 GHz, and a frequency band of the data noise N overlaps with the 5 GHz band, which is used in wireless LAN. The data noise N produced at the basic frequency is of a high level for noise, unlike data noise N produced in harmonics, and has a large effect on the wireless communication.

Thus, as mentioned above, the communication system selecting unit 113 illustrated in FIG. 4 selects a wired communication system in which a basic frequency of wired communication of the wired communication system does not overlap with or is not close to a using frequency band of the wireless communication. That is, in a case where the 2.4 GHz band is used in the wireless LAN, the communication system selecting unit 113 selects a wired communication system conforming to a wired communication standard other than USB 3.0, in which the basic frequency of wired communication is the closest to its using frequency band. In addition, in a case where the 5 GHz band is used in the wireless LAN, the communication system selecting unit 113 selects a wired communication system conforming to a wired communication standard other than USB 3.1, in which the basic frequency of wired communication coincides with its using frequency band. In addition, in a case where the 2.4 GHz band and the 5 GHz band are both used simultaneously in the wireless LAN, the communication system selecting unit 113 selects a wired communication system conforming to a wired communication standard other than USB 3.0 and USB 3.1.

As seen from the above, the communication system selecting unit 113 selects a wired communication system so that the basic frequency of wired communication falls outside a predetermined frequency band that includes a using frequency band of wireless communication. Here, in the case where the 2.4 GHz band is used in the wireless LAN, the predetermined frequency band described above is set at a frequency band ranging from 2.4 GHz to 2.5 GHz inclusive, preferably ranging from 2 GHz to 3 GHz inclusive. In the case where the 5 GHz band is used in the wireless LAN, the predetermined frequency band described above is set at a frequency band ranging from 5 GHz to 6 GHz inclusive, preferably ranging from 4 GHz to 7 GHz inclusive. Note that since it is desirable that the basic frequency of the wired communication is a frequency sufficiently separated from the using frequency band of the wireless communication, the above predetermined frequency band is not necessarily limited to one ranging from 2 GHz to 3 GHz inclusive or one ranging from 4 GHz to 7 GHz inclusive as described above.

In addition, in the present embodiment, the communication system selecting unit 113 selects a wired communication system having the highest data transfer rate, out of wired communication systems basic frequencies of which are outside the predetermined frequency band described above that includes a using frequency band of wireless communication. Specifically, in the case where the 2.4 GHz band is used in the wireless LAN, the communication system selecting unit 113 selects a wired communication system conforming to USB 3.1, a data transfer rate of which is the highest of the wired communication standards other than USB 3.0.

In a case where the wireless communication apparatus 20 can use USB 1.0 to USB 3.0 but cannot use USB 3.1 as a wired communication standards, the wireless communication apparatus 20 selects a wired communication system conforming to USB 2.0, a data transfer rate of which is the highest of the wired communication standards other than USB 3.0.

Figure 6A:
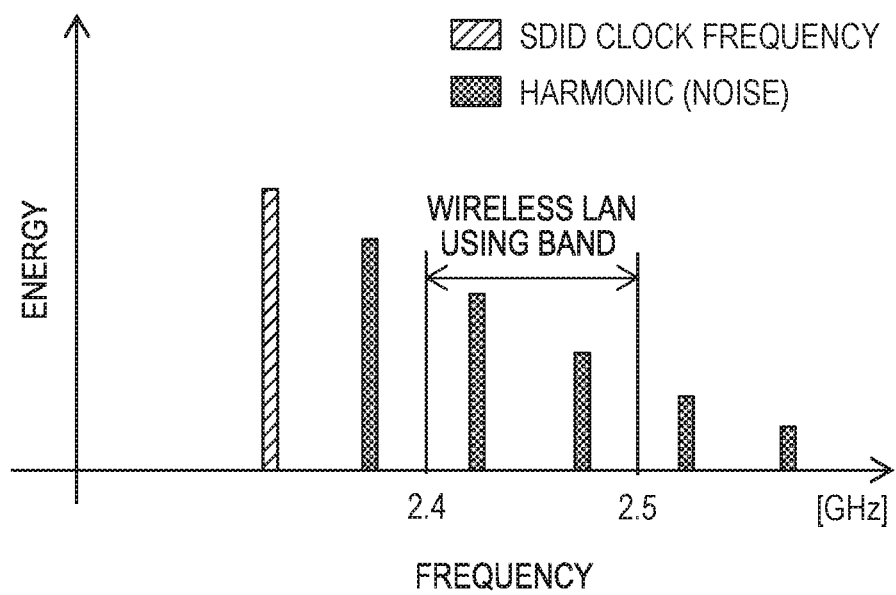
FIG. 6A is a conceptual view of a frequency spectrum of noise.
Figure 6B:
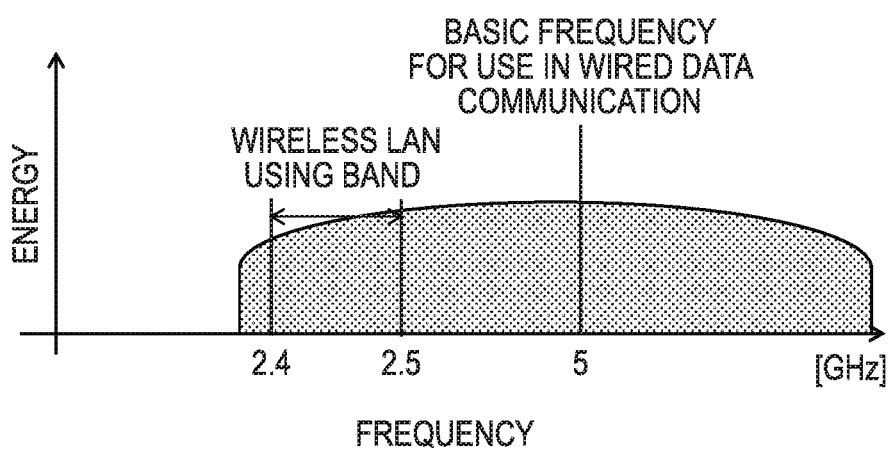
FIG. 6B is a conceptual view of a frequency spectrum of noise.

FIG. 6A is a conceptual view of a frequency spectrum of noise in a case where a noise source is a clock, and FIG. 6B is a conceptual view of a frequency spectrum of noise in a case where a noise source is data communication. The clock typically alternates ON and OFF with a constant period, and thus in the case where the noise source is a clock, its clock noises appear in a form of narrow frequency bands, as illustrated in FIG. 6A. Therefore, in a case where the clock noises have an adverse effect on the wireless communication, only slightly changing its clock frequency can shift the narrow-band clock noises to the outside of the using frequency band of the wireless communication easily, which can greatly reduce the adverse effect on the wireless communication.

In contrast, the data communication typically shows an ON/OFF period not constant, and thus in a case where the noise source is data communication, its data noise appears over a wide frequency band, as illustrated in FIG. 6B. Therefore, noise components can exist in a using frequency band of wireless communication, even in a case where a basic frequency in a frequency band used in the data communication, a frequency at which energy substantially maximizes, does not overlap with the using frequency band of wireless communication. That is, a performance of the wireless communication significantly deteriorates in some situation.

As mentioned above, the data noise appears over a wide frequency band. Therefore, noise components can exist in a using frequency band of wireless communication, even in a case where a basic frequency in a frequency band used in the data communication, a frequency at which energy substantially maximizes, does not overlap with the using frequency band of wireless communication. Therefore, in the case where the 2.4 GHz band is used in the wireless LAN, USB 2.0, which provides the highest data transfer rate while having a basic frequency that falls within a MHz band, may be selected rather than a wired communication system conforming to USB 3.1, a basic frequency of which falls within a GHz band.

In addition, in the case where the 5 GHz band is used in the wireless LAN, the communication system selecting unit 113 selects a wired communication system conforming to USB 3.0, a data transfer rate of which is the highest of the wired communication standards other than USB 3.1. The wired communication system conforming to USB 3.0 is selected also in a case where the wireless communication apparatus 20 can use USB 1.0, USB 1.1, USB 2.0, and USB 3.0 but cannot use USB 3.1 as a wired communication standards.

In addition, as mentioned above, the data noise appears over a wide frequency band. Therefore, noise components can exist in a using frequency band of wireless communication, even in a case where a basic frequency in a frequency band used in the data communication, a frequency at which energy substantially maximizes, does not overlap with the using frequency band of wireless communication. Therefore, in the case where the 5 GHz band is used in the wireless LAN, USB 2.0, ich provides the highest data transfer rate while having a basic frequency that falls within a MHz band, may be selected rather than a wired communication system conforming to USB 3.0, a basic frequency of which falls within a GHz band.

Figure 7:
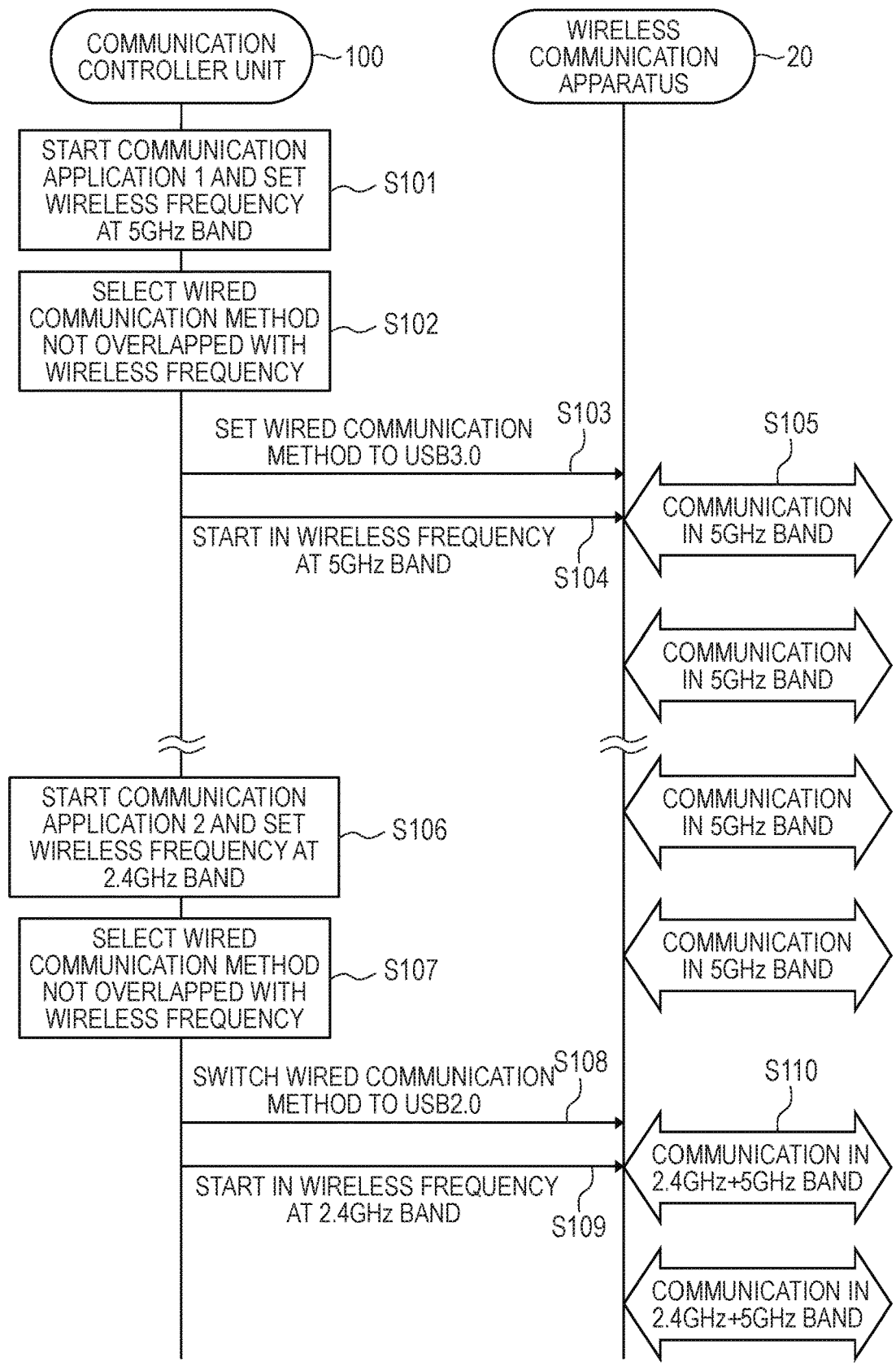
FIG. 7 is a sequence diagram of between a communication controlling unit and the wireless communication apparatus in a first embodiment.

FIG. 7 is a sequence diagram of between the communication controlling unit 100 and the wireless communication apparatus 20. Hereinafter, the alphabet S will mean a step.

First, the communication controlling unit 100 starts up a first communication application 1 and sets a using frequency of wireless communication used by the communication application 1 (wireless frequency) within the 5 GHz band (S101). Next, the communication controlling unit 100 selects a wired communication system a basic frequency of which does not overlap with a frequency band of the 5 GHz band (S102). Based on information shown in FIG. 5, USB 3.0 is selected here as the wired communication system. Next, the communication controlling unit 100 transmits instructions to set the wired communication system to USB 3.0, to the wireless communication apparatus 20 (S103). This causes the wireless communication apparatus 20 receiving the instructions to set the wired communication system to USB 3.0. In addition, the communication controlling unit 100 transmits instructions to start up the wireless transmitting and receiving unit 211 with a using frequency of wireless communication set at the 5 GHz band, to the wireless communication apparatus 20 (S104). This causes the wireless communication apparatus 20 receiving the instructions to start the wireless communication using the 5 GHz band with a communication apparatus on a communication side, such as a PC and smartphone (S105).

Thereafter, after a while, the communication controlling unit 100 starts up a second communication application 2 (S106). At that time, the communication controlling unit 100 sets a using frequency of wireless communication used by the communication application 2 within the 2.4 GHz band so as to avoid interference with the communication application 1, which has already been started up. Next, the communication controlling unit 100 selects a wired communication system a basic frequency of which does not overlap with the 5 GHz band already in use and a frequency band of the 2.4 GHz band newly started up (S107). Based on information shown in FIG. 5, USB 2.0 is selected here as the wired communication system. Next, the communication controlling unit 100 transmits instructions to switch the wired communication system to USB 2.0, to the wireless communication apparatus 20 (S108). This causes the wireless communication apparatus 20 receiving the instructions to switch the wired communication system to USB 2.0. In addition, the communication controlling unit 100 transmits instructions to start up the wireless transmitting and receiving unit 211 with a using frequency of wireless communication set at the 2.4 GHz band, to the wireless communication apparatus 20 (S109). This causes the wireless communication apparatus 20 receiving the instructions to start a wireless communication using the 2.4 GHz band in addition to the 5 GHz band (S110).

As described above, the wired communication system used in the wired communication is switched so that the basic frequency overlaps with none of the using frequencies of the plurality of wireless communications used by the plurality of communication applications.

Figure 8:
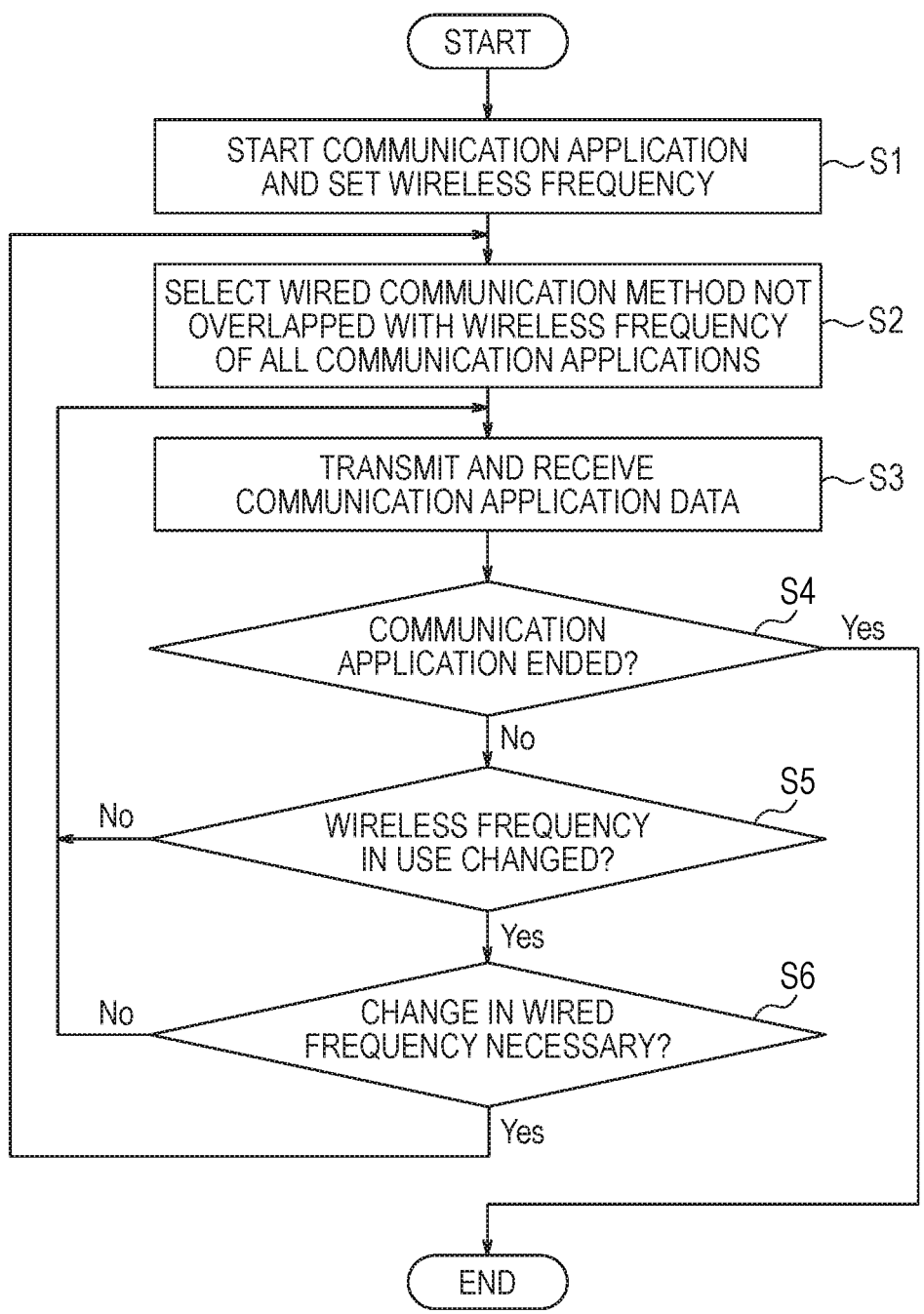
FIG. 8 is a flowchart illustrating processing of selecting a wired communication system in the first embodiment.

FIG. 8 is a flowchart illustrating a procedure of selecting the wired communication system performed when the communication controlling unit 100 starts up a predetermined communication application. The processing illustrated in FIG. 8 is actualized by a CPU included in the communication controlling unit 100 reading and executing a needed program. Note that the processing illustrated in FIG. 8 may be actualized by at least some of the function modules illustrated in FIG. 4 operating in a form of dedicated hardware. In this case, the dedicated hardware operates based on control by the CPU described above.

First, in S1, the communication application 111 starts a communication application based on instructions from a user of the electronic apparatus 10 and sets a using frequency of wireless communication (wireless frequency) used by the communication application. Next, in S2, the communication system selecting unit 113 selects a wired communication system a basic frequency of which does not overlap with using frequencies of wireless communications used by all of running communication applications. For example, in a case where, with a communication application using a frequency band within the 5 GHz band having been already started up, a communication application using a frequency band within the 2.4 GHz band is newly started up, it is necessary to avoid both frequency bands. In this case, the communication system selecting unit 113 selects a wired communication system conforming to the USB 2.0. In a case where there are no running communication applications, the communication system selecting unit 113 selects the wired communication system with consideration given only to a using frequency of wireless communication used by a newly started-up communication application.

In S3, the data transmitting and receiving unit 115 performs data exchange with the communication application. That is, the data transmitting and receiving unit 115 transmits data to the wireless communication apparatus 20 in the wired communication system selected in S2. In S4, the communication application 111 determines whether termination instructions for the communication application from the user have been detected, terminates the processing illustrated in FIG. 8 when the termination instructions have been detected, and shifts the procedure to S5 when the termination instructions have not been detected.

In S5, the communication controlling unit 100 determines whether the using frequency of the wireless communication being used by the communication application has been changed, and shifts the procedure to S6 when the change has been detected, and shifts the procedure to S3 when the change has not been detected. Here, the change of the using frequency of the wireless communication may be an autonomous switch to a using frequency having a better communication quality due to instructions by the user or depending on a communication situation of the wireless communication apparatus 20. In S6, along with the change of the using frequency of the wireless communication, the communication controlling unit 100 determines whether there is a need of switching the wired communication system currently used, and the communication controlling unit 100 shifts the procedure to S2 to select a wired communication system again when the switching is needed, and shifts the procedure to S3 when the switching is not needed.

As described above, the wireless communication apparatus 20 in the present embodiment has the wireless communication function that supports the plurality of wireless communication systems, and has the wired communication function that supports the plurality of wired communication systems using different basic frequencies in their data communications. In addition, the wireless communication apparatus 20 can simultaneously perform the plurality of wireless communications with different using frequencies. Then, in a case where the plurality of wired communications are simultaneously performed, the wireless communication apparatus 20 switches a wired communication system used in wired communication so that a basic frequency of the wired communication falls outside the predetermined frequency band that includes the using frequency bands of the plurality of wireless communications.

As seen from the above, the wireless communication apparatus 20 can switch the wired communication system so that the basic frequency of the wired communication overlaps with none of the using frequencies of the plurality of wireless communications even in a case where the plurality of wireless communications with different using frequencies are simultaneously performed. This can restrain noise produced in data communication using wired communication from having adverse effect on wireless communication. Therefore, deterioration in communication performance of the wireless communication apparatus 20 can be restrained, and decrease in communication throughput can be restrained.

Now, the wired communication systems (standards) include communication systems of parallel communication such as SDIO (Secure Digital Input/Output). In a case of using SDIO, a frequency of a clock signal traveling through a SDIO clock line can be changed according to a using frequency of wireless communication. This enables influence on the wireless communication to be mitigated. However, in a case of using a communication system of serial communication such as USB, USB includes no clock line and thus its data transfer rate cannot be changed as intended.

In contrast, the wireless communication apparatus 20 in the present embodiment has a wired communication function supporting a plurality of wired communication systems using different basic frequencies in their data communications and switches the wired communication systems according to a using frequency band of wireless communication. Therefore, even in a case of adopting a wired communication system a data transfer rate of which cannot be changed as intended due to without clock line, noise produced in data communication can be restrained from having adverse effect on wireless communication, which enables deterioration in wireless communication performance to be mitigated.

Additionally, in switching among the wired communication systems, the wireless communication apparatus 20 can also select and switches to a wired communication system a basic frequency of which is outside the above predetermined frequency band and has a highest data transfer rate of the plurality of wired communication systems. In this case, the noise produced in the data communication is restrained from having adverse effect on the wireless communication, and at the same time, high speed of the wireless communication can be taken advantage of.

In addition, the wireless communication apparatus 20 adopts the USB standard as a wired communication standard. The USB standard includes a plurality of standards having different data transfer rates, and the standards have compatibilities. Since USB 1.1 to USB 3.1 are upwardly compatible, adaptation of wired communication systems conforming to the USB standard enables a data transfer rate to be switched without changing hardware. That is, there is no need to implement pieces of hardware for the plurality of wired communication on the electronic circuit substrate 21 in a case where the data transfer rate of wired communication is switched to be used according to a using frequency band of wireless communication. This enables reduction of costs and a substrate area to be achieved accordingly.

Second Embodiment

Next, a second embodiment of the present invention will be described.

The first embodiment mentioned above is described along with the case where a wired communication system in which a basic frequency of wired communication does not exist in and in a vicinity of a using frequency band of wireless communication is selected and the wired communication system is switched. This second embodiment will be described along with a case where the wired communication system is selected with consideration given further to the data transfer rate of the wireless communication.

Figure 9:
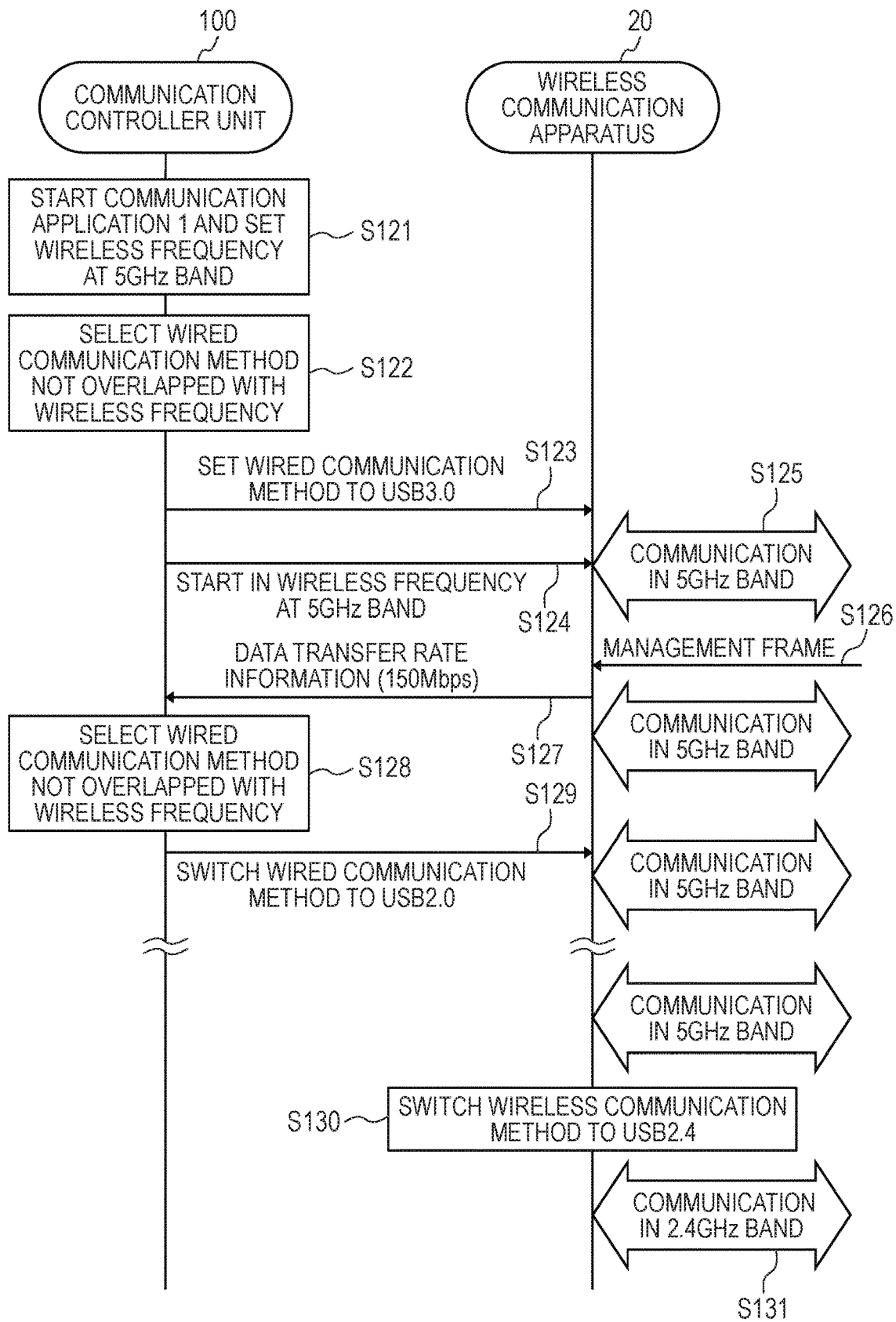
FIG. 9 is a sequence diagram of between a communication controlling unit and the wireless communication apparatus in a second embodiment.

The present embodiment will be described along with a case where the electronic apparatus 10 uses a single communication application. FIG. 9 is a sequence diagram of between the communication controlling unit 100 and the wireless communication apparatus 20.

First, the communication controlling unit 100 starts up a predetermined communication application and sets a using frequency of wireless communication used by the communication application (wireless frequency) within the 5 GHz band (S121). Next, the communication controlling unit 100 selects a wired communication system a basic frequency of which does not overlap with a frequency band of the 5 GHz band (S122). Based on information shown in FIG. 5, USB 3.0 is selected here as the wired communication system. Next, the communication controlling unit 100 transmits instructions to set the wired communication system to USB 3.0, to the wireless communication apparatus 20 (S123). This causes the wireless communication apparatus 20 receiving the instructions to set the wired communication system to USB 3.0. In addition, the communication controlling unit 100 transmits instructions to start up the wireless transmitting and receiving unit 211 with a using frequency of wireless communication set at the 5 GHz band, to the wireless communication apparatus 20 (S124). This causes the wireless communication apparatus 20 receiving the instructions to start the wireless communication using the 5 GHz band with a communication apparatus on a communication side, such as a PC and smartphone (S125).

Thereafter, when receiving a management frame from a counterpart apparatus of the wireless communication (S126), the wireless communication apparatus 20 notifies the communication controlling unit 100 of information included in the received management frame.

In a case of operating as a STA (Station: terminal station) in a wireless LAN, the wireless communication apparatus 20 receives the management frame called a Beacon frame, from the counterpart apparatus operating as an AP (Access Point: control station). This Beacon frame includes information regarding to a data transfer rate of wireless communication supported by the AP. In a case of operating as an AP in a wireless LAN, the wireless communication apparatus 20 receives a management frame called an Association Request frame when a communication apparatus operating as a STA is connected to wireless networks. This Association Request frame includes information regarding to a data transfer rate of wireless communication requested by the STA.

When receiving the management frame from the counterpart apparatus of the wireless communication, the wireless communication apparatus 20 notifies the communication controlling unit 100 of information regarding to the data transfer rate of the wireless communication (data transfer rate information) included in the management frame (S127). It is assumed here that the data transfer rate of the wireless communication is 150 Mbps, as an example.

When receiving the data transfer rate information on the wireless communication from the wireless communication apparatus 20, the communication controlling unit 100 selects a wired communication system again based on the received data transfer rate information and an effective data transfer rate of the wired communication system (S128). Here, since the data transfer rate of the wireless communication is 150 Mbps, it is understood based on the information illustrated in FIG. 5 that selecting USB 2.0, USB 3.0, or USB 3.1, in which effective data transfer rates of their wired communication systems are 150 Mbps or higher, will be sufficient as transfer rates. Hence, from among USB 2.0, USB 3.0, and USB 3.1, the communication controlling unit 100 selects a wired communication system a basic frequency of which does not overlap with using frequencies of all of wireless communications that can be used by the wireless communication apparatus 20. For example, in a case where the wireless communication apparatus 20 can use the 2.4 GHz band and the 5 GHz band, USB 2.0, a basic frequency of which does not overlap with the 2.4 GHz band and the 5 GHz band, is selected.

Next, the communication controlling unit 100 transmits instructions to switch the wired communication system to USB 2.0, to the wireless communication apparatus 20 (S129). This causes the wireless communication apparatus 20 receiving the instructions to switch the wired communication system to USB 2.0. It is assumed that Thereafter, after a while, the wireless communication apparatus 20 switches the using frequency of the wireless communication to the 2.4 GHz band (S130) due to, for example, detection of a deterioration in a communication quality of the 5 GHz band, and starts communication in the 2.4 GHz band. Even in such a case, since the wired communication system is switched to USB 2.0 in advance, switching the using frequency of the wireless communication does not bring about switching the wired communication system.

The example illustrated in FIG. 9 is described along with the case where the wireless communication apparatus 20 acquires the data transfer rate of the wireless communication from the management frame received from the counterpart apparatus of the wireless communication, but note that how to acquire the data transfer rate is not limited to the above. For example, a data transfer rate determined based on a wireless communication standard supported by the wireless communication apparatus 20 may be acquired. That is, in a case where the wireless communication apparatus 20 supports two wireless communication standards of the IEEE 802.11a standard and the IEEE 802.11b standard, a maximum data transfer rate of the wireless communication is 54 Mbps. Therefore, the maximum data transfer rate may be acquired as the data transfer rate of the wireless communication. In this case, the data transfer rate of the wireless communication can be acquired without receiving the management frame.

Figure 10:
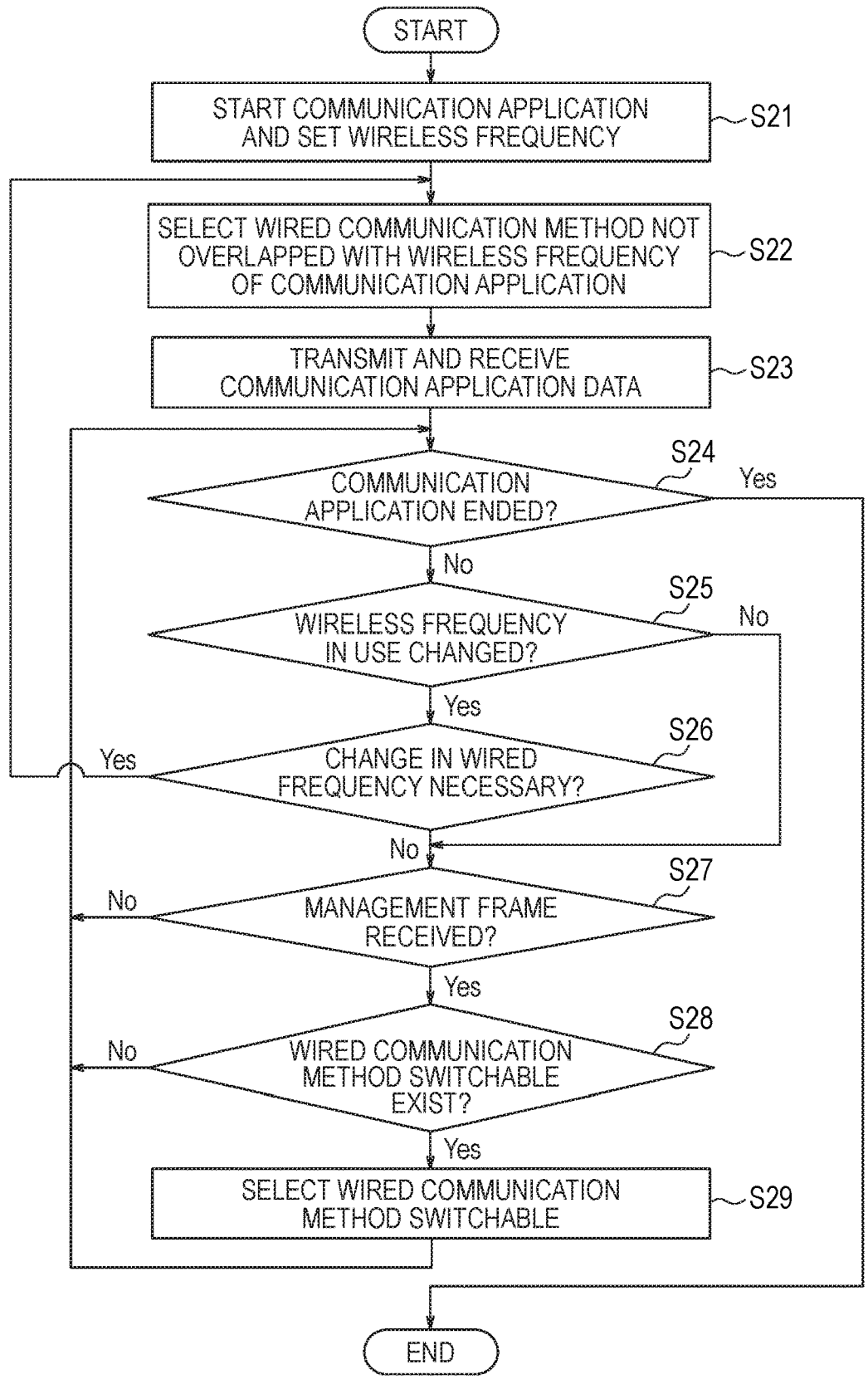
FIG. 10 is a flowchart illustrating processing of selecting a wired communication system in the second embodiment.

FIG. 10 is a flowchart illustrating a procedure of selecting the wired communication system performed when the communication controlling unit 100 starts up a predetermined communication application. The processing illustrated in FIG. 10 is actualized by a CPU included in the communication controlling unit 100 reading and executing a needed program. Note that the processing illustrated in FIG. 10 may be actualized by at least some of the function modules illustrated in FIG. 4 operating in a form of dedicated hardware. In this case, the dedicated hardware operates based on control by the CPU described above.

First, in S21, the communication application 111 performs the same process as S1 in FIG. 8. Next, in S22, the communication system selecting unit 113 selects a wired communication system a basic frequency of which does not overlap with using frequencies of wireless communications used by running communication applications. In S23, the data transmitting and receiving unit 115 performs the same process as S3 in FIG. 8. In S24, the communication application 111 performs the same process as S4 in FIG. 8.

In S25, as in S5 in FIG. 8, the communication controlling unit 100 determines whether the using frequency of the wireless communication being used by the communication application has been changed, and shifts the procedure to S26 when the change has been detected, and shifts the procedure to S27 when the change has not been detected. In S26, along with the change of the using frequency of the wireless communication, the communication controlling unit 100 determines whether there is a need of switching the wired communication system currently used, as in S6 in FIG. 8. The communication controlling unit 100 then shifts the procedure to S22 to select a wired communication system again when the switching is needed, and shifts the procedure to S27 when the switching is not needed.

In S27, the communication controlling unit 100 determines whether the wireless communication apparatus 20 has received a management frame from a communication counterpart of the wireless communication such as a smartphone and a PC. Specifically, the communication controlling unit 100 determines whether data transfer rate information has been received from the wireless communication apparatus 20. Then, when the data transfer rate information has been received, the communication controlling unit 100 shifts the procedure to S28, and shifts the procedure to S24 when the data transfer rate information has not been received.

In S28, the communication controlling unit 100 determines based on the data transfer rate information whether a wired communication system switchable exists. Here, the wired communication system switchable is a wired communication system that has an effective data transfer rate equal to or higher than the data transfer rate of the wireless communication, and a basic frequency of which does not overlap with using frequencies of all of the wireless communications supported by the wireless communication apparatus 20. Then, when determining that the wired communication system in question does not exist, the communication controlling unit 100 shifts the procedure to S24, and when determining that the wired communication system in question exists, the communication controlling unit 100 shifts the procedure to S29 and newly selects the wired communication system in question. Consider a case where, for example, the data transfer rate of the wireless communication is 150 Mbps, and using frequencies of the wireless communications supported by the wireless communication apparatus 20 are the 2.4 GHz band and the 5 GHz band. In this case, USB 2.0, an effective data transfer rate of which is 150 Mbps or higher and operates at a basic frequency of which does not overlap with the 2.4 GHz band and the 5 GHz band, is selected.

As described above, the wireless communication apparatus 20 in the present embodiment has the wireless communication function that supports the plurality of wireless communication systems, and has the wired communication function that supports the plurality of wired communication systems using different basic frequencies in their data communications. In addition, the wireless communication apparatus 20 acquires the data transfer rate of the wireless communication. The wireless communication apparatus 20 then switches the wired communication system used in the wired communication so that the basic frequency falls outside the predetermined frequency band including the using frequency band of the plurality of supported wireless communications, and the effective data transfer rate becomes equal to or higher than the acquired data transfer rate. In this manner, the wireless communication apparatus 20 can select and switch in advance to the wired communication system that operates at a basic frequency that does not overlap with using frequencies of all of possibly used wired communications as long as the basic frequency satisfies the data transfer rate of the wireless communication. This dispenses with a need of switching the wired communication system even when the using frequency of the wireless communication is switched. As a result, communication interruption that occurs between the communication controlling unit 100 and the wireless communication apparatus 20 along with the switching the wired communication system is restrained, which enables enhancement in communication speed and reduction in delay time.

In a case where the wireless communication apparatus 20 operates as an access point (AP), the wireless communication apparatus 20 can receive a management frame transmitted from another wireless communication apparatus that is connected to the AP, and can acquire information regarding to the data transfer rate included in the management frame. In a case where the wireless communication apparatus 20 operates as an apparatus (STA) that is connected to an access point (AP), the wireless communication apparatus 20 can receive a management frame transmitted from the AP, and can acquire information regarding to the data transfer rate included in the management frame. As seen from the above, the wireless communication apparatus 20 can acquire the data transfer rate of the wireless communication with high accuracy based on the management frame.

Third Embodiment

Next, a third embodiment of the present invention will be described.

The first embodiment mentioned above is described along with the case where a wired communication system in which a basic frequency of wired communication does not exist in and in a vicinity of a using frequency band of wireless communication is selected and the wired communication system is switched. This third embodiment will be described along with a case where when a signal power changes due to changes in an environment of the wireless communication, the wired communication system is changed appropriately following the change in the signal power.

A communication speed of wireless communication depends typically on Signal-to-Noise Ratio (SNR). With a higher SNR, the wireless communication can be performed more stably, and the communication speed becomes higher. In contrast, with a lower SNR, the communication speed becomes lower. This is because signals are disturbed by noises and become difficult to demodulate if an SNR is low when the wireless communication apparatus 20 receives data. Here, the signal power, referred to by S in SNR, is determined according to, for example, a distance from the wireless communication apparatus 20 and a wireless communication apparatus being a communication counterpart of the wireless communication apparatus 20 (hereinafter, referred to as a "counter apparatus"), a surrounding environment where an electromagnetic wave serving as a signal propagates, and the like. That is, a signal power in wireless communication is inconstant and can always change due to movement of the wireless communication apparatus 20 or a change in its surrounding environment.

Hence, in the present embodiment, in a case where the signal power changes due to a change in an environment of wireless communication, a standard of wired communication is changed appropriately following to the change in the signal power. Specifically, in the present embodiment, an SNR of wireless communication is acquired with a predetermined period, and according to the acquired SNR, the wired communication system is changed from a currently used wired communication system.

FIG. 11 is a flowchart illustrating a procedure of changing the wired communication system performed by the wireless communication apparatus 20 in the present embodiment. Hereinafter, the alphabet S will mean a step in the flowchart. The processing illustrated in FIG. 11 is actualized by a CPU included in the controlling unit 202 or the wireless unit 204 reading and executing a needed program. Note that the processing illustrated in FIG. 11 may be actualized by at least some of the function modules illustrated in FIG. 4 operating in a form of dedicated hardware. In this case, the dedicated hardware operates based on control by the CPU described above.

First, in S31, the wireless transmitting and receiving unit 211 determines the wireless communication system based on, for example, instructions from a user of the electronic apparatus 10. A using frequency band of the wireless communication system is thereby determined. Here, in a case where the electronic apparatus 10 functions as a station, the wireless transmitting and receiving unit 211 determines the wireless communication system based on a wireless LAN standard used by a counter apparatus to which the user of the electronic apparatus 10 intends to connect. In contrast, in a case where the electronic apparatus 10 functions as an access point, the wireless transmitting and receiving unit 211 determines the wireless communication system based on a wireless LAN standard used by the user.

Next, in S32 the communication system selecting unit 113 selects a wired communication system having a highest data transfer rate among wired communication systems basic frequencies of which do not overlap with or are not close to the using frequency band of the wireless communication system determined in S31. The method for selecting the wired communication system in this S32 is similar to that of the first embodiment mentioned above. The communication system switching unit 212 then switches the wired communication system to the wired communication system selected by the communication system selecting unit 113.

In S33, the wireless transmitting and receiving unit 211 measures the SNR while the wireless communication is performed. For example, the wireless transmitting and receiving unit 211 may acquire an SNR measured through processing performed in the WiFi chip 23.

In S34, the communication system selecting unit 113 determines whether the wired communication system currently used is a wired communication system that is suitable for the SNR measured in S33. For example, the communication system selecting unit 113 determines whether the SNR measured in S33 is equal to or less than a first threshold value or equal to or greater than a second threshold value, which is greater than the first threshold value. When the SNR is greater than the first threshold value and less than the second threshold value, the communication system selecting unit 113 shifts the procedure to S35, and when the SNR is equal to or less than the first threshold value or equal to or greater than the second threshold value, the communication system selecting unit 113 determines that the wired communication system currently used is not the wired communication system that is suitable for the SNR, and shifts the procedure to S36.

As mentioned above, with a higher SNR, the communication speed in the wireless communication becomes high, and conversely with a lower SNR, the communication speed in the wireless communication becomes low. Hence, in the present embodiment, a range greater than first threshold value and less than the second threshold value is set as an appropriate range of the SNR, and when the SNR is outside the appropriate range, it is determined that the wired communication system currently used is not a wired communication system suitable for the SNR.

Note that the communication system selecting unit 113 may hold a relation between an SNR and a wired communication system suitable for the SNR for each wired communication system beforehand in a form of a table, and may look up the table to determine whether the wired communication system currently used is the wired communication system that is suitable for the SNR.

Alternatively, because the relation between an SNR and a wired communication system suitable for the SNR differs according to the wireless communication system, the communication system selecting unit 113 may hold a relation between an SNR and a wired communication system suitable for the SNR in each wireless communication system beforehand in a form of a table, and may look up the table to determine whether the wired communication system currently used is the wired communication system that is suitable for the SNR.

In S35, the wireless transmitting and receiving unit 211 uses a timer to measure a time elapsed from the measurement of the SNR in S33, and returns the procedure to S33 after a lapse of a certain period of time. As mentioned above, a communication environment of wireless communication is inconstant and always changes due to movement of the wireless communication apparatus or a change in its surrounding environment. The wireless transmitting and receiving unit 211 is therefore adapted to perform the measurement of the SNR with a predetermined period.

In S36, the communication system selecting unit 113 selects a wired communication system suitable for the SNR measured in S33, and the communication system switching unit 212 switches the wired communication system to the selected wired communication system. As mentioned above, with a higher SNR, the communication speed of the wireless communication becomes high, and with a lower SNR, the communication speed of the wireless communication becomes low. Hence, when the SNR is equal to or less than the first threshold value, the communication system selecting unit 113 selects a wired communication system that decreases a power of the data noise so as to increase the SNR to within the appropriate range to increase the communication speed of the wireless communication. In contrast, when the SNR is equal to or greater than the second threshold value, the communication system selecting unit 113 selects a wired communication system that increases the power of the data noise because the SNR is sufficiently high, and stable wireless communication can be performed even when the power of the data noise is increased.

In a case where the wired communication standard is the USB standard as in the present embodiment, a basic frequency of the data communication approaches a GHz band as the data transfer rate increases. Since the using frequency band of the wireless communication is in the GHz band in the present embodiment, the data transfer rate of the wired communication has to be decreased to decrease the power of the data noise in the using frequency band of the wireless communication. This can separate the basic frequency used in the wired communication from the using frequency band of the wireless communication, which enables control toward decreasing the power of the data noise. As seen from the above, in power of noise, the power of the data noise occurring in data communication can be controlled easily by changing the wired communication system.

Therefore, in a case where the SNR is equal to or greater than the second threshold value, which indicates that a high-speed wireless communication can be performed even when the power of noise increases, the communication system selecting unit 113 changes a wired communication system to use to a faster wired communication system. For example, the communication system selecting unit 113 changes the wired communication system to use to a wired communication system that is faster than before by one step. The high speed of the wireless communication can be thereby taken advantage of. However, the wired communication system is not changed in a case where the wired communication system currently used is a standard a data transfer rate of which is the highest.

In contrast, in a case where the SNR is equal to or less than the first threshold value, which indicates that the communication speed of the wireless communication is not an appropriate speed, the communication system selecting unit 113 changes the wired communication system to use to a slower wired communication system. For example, the communication system selecting unit 113 changes the wired communication system to use to a wired communication system that is slower than before by one step. This can reduce the power of noise of data noise in the using frequency band of the wireless communication, which enables an increase in speed of the wireless communication to be intended.

After the wired communication system is changed in S36, the procedure shifts to S35, and returns to S33 after a lapse of the certain period of time. In S36, the communication system selecting unit 113 may look up the table mentioned above to select a wired communication system suitable for the SNR.

As described above, the wireless communication apparatus 20 in the present embodiment acquires the signal to noise ratio (SNR) in the wireless communication and changes, based on the acquired SNR, the wired communication system used in the wired communication from the wired communication system currently used. At that time, in a case where the acquired SNR is equal to or less than the first threshold value, the wireless communication apparatus 20 changes the wired communication system used in the wired communication to a wired communication system a data transfer rate of which is lower than the wired communication system currently used. In contrast, in a case where the acquired SNR is equal to or greater than the second threshold value, which is greater than the first threshold value, the wireless communication apparatus 20 changes the wired communication system used in the wired communication to a wired communication system a data transfer rate of which is higher than the wired communication system currently used.

This enables the wired communication system to be selected appropriately to adjust a level of the data noise while the communication environment of the wireless communication varies, enabling a high-speed wireless communication to be performed.

The method for selecting the wired communication system in the first embodiment mentioned above can bring about a case where a high-speed wireless communication is performed in the wireless communication, while a low-speed wired communication is performed in the wired communication. In this case, a communication system of the electronic apparatus 10 can experience a case where the communication speed of the wireless communication decreases due to rate controlling cause by a low data transfer rate of the wired communication. In contrast, the present embodiment allows a higher wired communication system to be selected in some communication environment of the wireless communication, which enables an increase in speed of the wireless communication to be intended and enables an occupancy of the using frequency band of the wireless communication can be decreased. In addition, a power necessary for the wireless communication can be reduced.

In addition, since the communication environment of the wireless communication is inconstant, the wireless communication apparatus 20 acquires the SNR with the predetermined period, determines whether the wired communication system currently used is a wired communication system suitable for SNR, and changes the wired communication system as needed. In this manner, by acquiring the SNR periodically, the wired communication system can be changed appropriately in response to a change in the communication environment of the wireless communication.

Fourth Embodiment

Next, a fourth embodiment of the present invention will be described.

The embodiments mentioned above are described along with the case where the wired communication system to use is switched according to the using frequency band of the wireless communication. This fourth embodiment is described along with a case where the wired communication system to use is switched according to whether the electronic apparatus (wireless communication apparatus) is on a transmission side or on a reception side of electronic data. Here, the electronic data described above is data in a form that allows the data to be taken in a computer, and includes, for example, image data, video data, and the like.

If the SNR is low when the wireless communication apparatus 20 receives data, signals are disturbed by noise and become difficult to demodulate. In contrast, when the wireless communication apparatus 20 transmits data, a magnitude of the power of noise detected by the wireless communication apparatus 20 has no significant effect on the wireless communication. Hence, the present embodiment will be described along with a method for performing a high-speed wireless communication by selecting a standard of wired communication appropriately in each of a case where the electronic apparatus 10 transmits data to a counter apparatus and a case where the electronic apparatus 10 receives data from the counter apparatus.

First, the case where the electronic apparatus 10 (the wireless communication apparatus 20) is on the reception side of the electronic data will be described. In a case where the wireless communication apparatus 20 is on the reception side of the data, when a power of noise of data noise occurring in wired communication within a using frequency band of wireless communication is high, the noise has a significant effect on the wireless communication. Therefore, in the case where the electronic apparatus 10 is on the reception side of the electronic data, the wired communication system is selected using the methods described in the first embodiment and the second embodiment mentioned above. This mitigates of an adverse effect of the data noise on the wireless communication, enabling a high-speed wireless communication.

Next, the case where the electronic apparatus 10 (the wireless communication apparatus 20) is on the transmission side of the electronic data will be described. In a case where the wireless communication apparatus 20 is on the transmission side of the data, even when the power of noise of data noise occurring in wired communication within the using frequency band of wireless communication is high, the noise has no significant effect on the wireless communication. Therefore, in the case where the electronic apparatus 10 is on the transmission side of the electronic data, a highest wired communication system can be selected. This case dispenses with a need of considering the basic frequency of the wired communication system as in the first embodiment and the second embodiment. This enables the electronic apparatus 10, as a communication system, to transmit the electronic data to the counter apparatus at high speed.

Note that when receiving the electronic data from the counter apparatus, the electronic apparatus 10 has to transmit a small amount of data such as an ACK packet to the counter apparatus. Therefore, also when being on the reception side of the electronic data, the electronic apparatus 10 may select the fastest wired communication system to transmit the small amount of data such as an ACK packet.

In addition, after having transmitted the electronic data to the counter apparatus, the electronic apparatus 10 receives a small amount of data such as an ACK packet from the counter apparatus. However, since the data is in a small amount, the data has a little effect even when the SNR becomes low due to the data noise of the wired communication to lead to a lower communication speed of the ACK packet. Thus, in receiving the small amount of data such as an ACK packet, there is no need to switch the wired communication system with consideration given to an effect of the data noise on the wireless communication.

However, when the electronic apparatus 10 falls into a state where the electronic apparatus 10 hardly receives the ACK packet, the electronic apparatus 10 retransmits the electronic data to the counter apparatus repeatedly. Hence, in this case, the wired communication system may be selected to receive the ACK packet using the methods described in the first embodiment and the second embodiment. Alternatively, a wired communication system may be selected that is faster than a wired communication system used in the case mentioned above where the electronic apparatus 10 (the wireless communication apparatus 20) is on the reception side of the electronic data, and slower than the fastest wired communication system.

As described above, the wireless communication apparatus 20 in the present embodiment determines whether it is on a reception side or a transmission side of the wired communication, and changes the method for selecting the wired communication system according to a result of the determination. This enables the wired communication system to be selected appropriately, enabling the wireless communication to be performed at high speed. Examples of an available method for determining whether the wireless communication apparatus 20 is on the transmission side or the reception side of the electronic data include a method in which the determination is performed on an application program that is used by a user of the electronic apparatus 10 to communicate with the counter apparatus.

(Modifications)

The above embodiments are described along with the case where the electronic apparatus 10 is a digital camera, but the electronic apparatus 10 is not limited to digital cameras. For example, the electronic apparatus 10 may be a mobile phone, a smartphone, a tablet terminal, a personal computer (PC), a printer, a video camera, a smartwatch, a PDA, or the like.

The above embodiments are described along with the case where the wired communication system is selected in the main electronic circuit substrate as the other communication apparatus that performs the wired communication with the wireless communication apparatus 20. However, the wired communication system may be selected in the electronic circuit substrate of the wireless communication apparatus 20. That is, the wireless communication apparatus having the wireless communication function and the wired communication function may select the wired communication system according to the wireless communication system used by itself in the wireless communication. In this case, the communication system selecting unit 113 illustrated in FIG. 4 need not be included in the communication controlling unit 100, and the wireless communication apparatus 20 includes a function module that is equivalent to the communication system selecting unit 113.

In addition, the wireless communication apparatus 20 need not be incorporated in the electronic apparatus 10 and may be an apparatus separate from the electronic apparatus 10. Also in this case, if the antenna for performing the wireless communication by the wireless communication apparatus 20 is close to a cable, a connector, or the like that connects the wireless communication apparatus 20 to the electronic apparatus 10, the data noise of the wired communication can have an adverse effect on the wireless communication. Hence, by applying the present invention also to the communication system described above, the data noise of the wired communication can be restrained from having the adverse effect on the wireless communication.

Furthermore, the above embodiments are described along with the case where the wireless communication standard used by the wireless communication apparatus 20 is one of the IEEE802.11 series of standards, which are communication standards for wireless LAN, and the wired communication standard used by the wireless communication apparatus 20 is the USB standard. However, the wireless communication standard and the wired communication standard used by the wireless communication apparatus 20 are not limited to the above. For example, the PCI Express standard may be used as the wired communication standard. The PCI Express standard includes a plurality of standards such as Gen1, Gen2, Gen3, and Gen4. For example, in a case where the using frequency band of the wireless communication is the 2.4 GHz band, wired communication systems other than the PCI Express 2.0 (Gen2) may be selected and used. In addition, as the wireless communication standard, for example, a wireless communication standard using a 60 GHz band such as the IEEE 802.11ad or a wireless communication standard using a 920 MHz band used in IoT and M2M may be used. Furthermore, as the wireless communication standard, a wireless communication standard using 800, 1500, 1800, 2100 MHz bands, which are used in LTE, may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, adverse effect of noise occurring in wired data communication on wireless communication performance can be mitigated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A wireless communication apparatus comprising:
   a first communication unit configured to perform wireless communication that supports a plurality of wireless communication systems that use different frequency bands;
   a second communication unit configured to perform wired communication that supports a plurality of wired communication systems that each use a different basic frequency for data communication;
   a switching unit configured to switch a wired communication system used in the wired communication by the second communication unit so that the basic frequency falls outside of a predetermined frequency band including the frequency bands used in the wireless communication by the first communication unit;
an acquiring unit configured to acquire a signal to noise ratio in the wireless communication by the first communication unit; and
a changing unit configured to change the wired communication system used in the wired communication by the second communication unit from a wired communication system currently being used,
wherein the changing unit (i) changes the wired communication system used in the wired communication by the second communication unit to a wired communication system of which a data transfer rate is lower than a data transfer rate of the wired communication system currently being used in a case where the signal to noise ratio acquired by the acquiring unit is equal to or less than a first threshold value, and (ii) changes the wired communication system used in the wired communication by the second communication unit to a wired communication system of which a data transfer rate is higher than the data transfer rate of the wired communication system currently used in a case where the signal to noise ratio acquired by the acquiring unit is greater than a second threshold value that is greater than the first threshold value.

2. The wireless communication apparatus according to claim 1, wherein the acquiring unit acquires the signal to noise ratio with a predetermined period.

3. A wireless communication apparatus comprising:
a first communication unit configured to perform wireless communication that supports a plurality of wireless communication systems that use different frequency bands;
a second communication unit configured to perform wired communication that supports a plurality of wired communication systems that each use a different basic frequency for data communication;
a switching unit configured to switch a wired communication system used in the wired communication by the second communication unit so that the basic frequency falls outside of a predetermined frequency band including the frequency bands used in the wireless communication by the first communication unit; and
a determining unit configured to determine whether the wireless communication apparatus is on a reception side or a transmission side of the wireless communication,
wherein the switching unit switches the wired communication system used in the wired communication by the second communication unit so that the basic frequency falls outside the predetermined frequency band in a case where the determining unit determines that the wireless communication apparatus is on the reception side of the wireless communication.

4. The wireless communication apparatus according to claim 3, wherein the switching unit switches the wired communication system used in the wired communication by the second communication unit to a wired communication system of which a data transfer rate is highest of data transfer rates of the plurality of wired communication systems without regard to the frequency bands of the wireless communication used by the first communication unit in a case where the determining unit determines that the wireless communication apparatus is on the transmission side of the wireless communication.

5. A wireless communication apparatus comprising:
a first communication unit configured to perform wireless communication that supports a plurality of wireless communication systems that use different frequency bands;
a second communication unit configured to perform wired communication that supports a plurality of wired communication systems that each use a different basic frequency for data communication; and
a switching unit configured to switch a wired communication system used in the wired communication by the second communication unit so that the basic frequency falls outside of a predetermined frequency band including the frequency bands used in the wireless communication by the first communication unit,
wherein in a case where the first communication unit performs simultaneously a plurality of wireless communications in which the frequencies used are different from each other, the switching unit switches the wired communication system used in the wired communication by the second communication unit so that the basic frequency falls outside of a predetermined frequency band including the frequency bands used in the plurality of wireless communications that are performed simultaneously.

6. The wireless communication apparatus according to claim 5, wherein the plurality of wired communication systems have compatibilities.

7. The wireless communication apparatus according to claim 5, wherein the plurality of wired communication systems conform to a plurality of USB standards.

8. The wireless communication apparatus according to claim 5, wherein the plurality of wireless communication systems use a frequency band of at least one of a 2.4 GHz band and a 5 GHz band.

9. The wireless communication apparatus according to claim 8, wherein one of the plurality of wireless communication systems uses a frequency band ranging from 2.4 GHz to 2.5 GHz inclusive.

10. The wireless communication apparatus according to claim 9, wherein another one of the plurality of wireless communication systems uses a frequency band ranging from 5 GHz to 6 GHz inclusive.

11. The wireless communication apparatus according to claim 5, wherein the plurality of wired communication systems conform to PCI Express standards.

12. The wireless communication apparatus according to claim 5, wherein the plurality of wireless communication systems conform to IEEE802.11 series of standards.

13. A method for controlling a wireless communication apparatus including a first communication unit configured to perform wireless communication that supports a plurality of wireless communication systems that use different frequency bands and a second communication unit configured to perform wired communication that supports a plurality of wired communication systems that each use a different basic frequency for data communication, the method comprising:
switching a wired communication system used in the wired communication by the second communication unit so that the basic frequency falls outside of a predetermined frequency band including the frequency bands used in the wireless communication by the first communication unit,
wherein in a case where the first communication unit performs simultaneously a plurality of wireless communications in which the frequencies used are different from each other, the wired communication system used in the wired communication by the second communication unit is switched so that the basic frequency falls outside of a predetermined frequency band including the frequency bands used in the plurality of wireless communications that are performed simultaneously.

14. A non-transitory computer-readable recording medium storing a readable program for causing a computer to function as each of the units of a wireless communication apparatus, the wireless communication apparatus comprising:

a first communication unit configured to perform wireless communication that supports a plurality of wireless communication systems that use different frequency bands;

a second communication unit configured to perform wired communication that supports a plurality of wired communication systems that each use a different basic frequency for data communication; and a switching unit configured to switch a wired communication system used in the wired communication by the second communication unit so that the basic frequency falls outside of a predetermined frequency band including the frequency bands used in the wireless communication by the first communication unit, wherein in a case where the first communication unit performs simultaneously a plurality of wireless communications in which the frequencies used are different from each other, the switching unit switches the wired communication system used in the wired communication by the second communication unit so that the basic frequency falls outside of a predetermined frequency band including the frequency bands used in the plurality of wireless communications that are performed simultaneously.

* * * * *